United States Patent
Cheng et al.

(10) Patent No.: US 10,488,692 B2
(45) Date of Patent: Nov. 26, 2019

(54) TOUCH DISPLAY DEVICE

(71) Applicant: E Ink Holdings Inc., Hsinchu (TW)

(72) Inventors: Hsiao-Lung Cheng, Hsinchu (TW); Chi-Mao Hung, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 200 days.

(21) Appl. No.: 15/620,829

(22) Filed: Jun. 13, 2017

(65) Prior Publication Data

US 2017/0357118 A1    Dec. 14, 2017

Related U.S. Application Data

(60) Provisional application No. 62/349,645, filed on Jun. 13, 2016.

(51) Int. Cl.
| | | |
|---|---|---|
| G02F 1/1333 | (2006.01) | |
| G06F 3/044 | (2006.01) | |
| G06F 3/041 | (2006.01) | |
| G02F 1/03 | (2006.01) | |
| G02F 1/167 | (2019.01) | |

(52) U.S. Cl.
CPC ........ *G02F 1/13338* (2013.01); *G02F 1/0316* (2013.01); *G02F 1/167* (2013.01); *G06F 3/044* (2013.01); *G06F 3/0412* (2013.01); *G06F 3/0416* (2013.01)

(58) Field of Classification Search
CPC .... G02F 1/13338; G02F 1/167; G02F 1/0316; G06F 3/044; G06F 3/0416; G06F 3/0412
See application file for complete search history.

(56) References Cited

U.S. PATENT DOCUMENTS

| | | |
|---|---|---|
| 2009/0109185 A1 | 4/2009 | Barclay et al. |
| 2012/0062503 A1 | 3/2012 | Zhuang et al. |
| 2012/0105434 A1 | 5/2012 | Kuo et al. |
| 2012/0146943 A1 | 6/2012 | Fairley et al. |
| 2015/0138736 A1 | 5/2015 | Catchpole |
| 2015/0185946 A1 | 7/2015 | Fourie |
| 2015/0296063 A1 | 10/2015 | Reeves |
| 2016/0014882 A1 | 1/2016 | Jongman et al. |

FOREIGN PATENT DOCUMENTS

| | | | | |
|---|---|---|---|---|
| CN | 103529616 | | 1/2014 | |
| CN | 103329082 | | 5/2016 | |
| TW | 1357010 B | * | 1/2012 | ......... G02F 1/13338 |
| TW | I357010 | | 1/2012 | |

OTHER PUBLICATIONS

"Office Action of Taiwan Counterpart Application," dated Jan. 5, 2018, p. 1-p. 5, in which the listed references were cited.

* cited by examiner

*Primary Examiner* — Charles V Hicks
(74) *Attorney, Agent, or Firm* — JCIPRNET

(57) ABSTRACT

A touch display device including a driving substrate, a display module, a touch electrode layer and an insulating layer is provided. The driving substrate has a display area and a non-display area located outside the display area. The display module includes a display medium layer, a transparent conductive layer and a transparent cover plate sequentially arranged on the driving substrate and located in the display area. The touch electrode layer is disposed in the non-display area of the driving substrate or outside the driving substrate. The insulating layer covers an upper surface of the display module and extendedly covers a top surface of the touch electrode layer along a side edge of the display module.

13 Claims, 7 Drawing Sheets

TOUCH DISPLAY DEVICE

CROSS-REFERENCE TO RELATED APPLICATION

This application claims the priority benefits of U.S. provisional application Ser. No. 62/349,645, filed on Jun. 13, 2016. The entirety of the above-mentioned patent application is hereby incorporated by reference herein and made a part of this specification.

BACKGROUND OF THE INVENTION

Field of the Invention

The invention relates to a display device, and more particularly, to a touch display device.

Description of Related Art

In the prior art, the touch display device is composed of a driving substrate, a display module disposed on the driving substrate, and an externally-attached touch substrate adhered on the display module through an optical adhesive layer. However, the touch substrate externally attached on the display module makes a thickness of the touch display device irreducible and unable to meet the demand for thinner product. Moreover, the externally-attached touch substrate will also decrease a display contrast ratio of the touch display device and thus affect a display quality of the touch display device.

SUMMARY OF THE INVENTION

The invention is directed to a touch display device, which has thinner thickness and more preferable display contrast ratio.

The touch display device of the invention includes a driving substrate, a display module, a touch electrode layer and an insulating layer. The driving substrate has a display area and a non-display area, and the non-display area is located outside the display area. The display module includes a display medium layer, a transparent conductive layer and a transparent cover plate sequentially arranged on the driving substrate and located in the display area. The touch electrode layer is disposed in the non-display area of the driving substrate or outside the driving substrate. The insulating layer covers an upper surface of the display module and extendedly covers a top surface of the touch electrode layer along a side edge of the display module. When the touch display device is in a touch state and a conductor performs a touch control on the touch display device, a first induced capacitance and a second induced capacitance connected in series are formed between the conductor and the touch electrode layer and between the conductor and the transparent conductive layer, respectively.

In an embodiment of the embodiment, the touch electrode layer is disposed on an external circuit outside the driving substrate.

In an embodiment of the embodiment, the external circuit covers a part of the non-display area of the driving substrate, or a gap is provided between the external circuit and the driving substrate.

In an embodiment of the embodiment, a parasitic capacitance exists between the touch electrode layer and the transparent conductive layer when the touch display device is in the touch state, and the parasitic capacitance is connected in parallel with the first induced capacitance and the second induced capacitance connected in series when the conductor performs the touch control on the touch display device.

In an embodiment of the embodiment, when the touch display device is in the touch state, an electrode on the driving substrate is connected to a floating voltage, the transparent conductive layer is connected to a ground voltage or a first predetermined voltage, and the touch electrode layer is connected to a second predetermined voltage.

In an embodiment of the embodiment, when the touch display device is in a display update process, an electrode on the driving substrate is connected to a driving voltage, the transparent conductive layer is connected to a predetermined voltage, and the touch electrode layer is connected to a ground voltage.

In an embodiment of the embodiment, when the touch display device is in a shutdown state, an electrode on the driving substrate is connected to a first floating voltage, the transparent conductive layer is connected to a second floating voltage, and the touch electrode layer is connected to a ground voltage or a third floating voltage.

In an embodiment of the embodiment, the touch display device further includes a plurality of icons, distributedly disposed on the display module and adjacent to the side edge of the display module.

In an embodiment of the embodiment, the touch display device further includes a control circuit, disposed in the non-display area of the driving substrate, and electrically connected to the touch electrode layer and the transparent conductive layer.

In an embodiment of the embodiment, the touch display device further includes a first control circuit and a second control circuit. The first control circuit is disposed in the non-display area of the driving substrate, and electrically connected to the transparent conductive layer. The second control circuit is disposed outside the driving substrate, and electrically connected to the touch electrode layer.

In an embodiment of the embodiment, the touch electrode layer and the second control circuit are respectively disposed on a first external circuit and a second external circuit outside the driving substrate.

In an embodiment of the embodiment, the touch electrode layer and the second control circuit are respectively disposed on a first external circuit and a second external circuit outside the driving substrate, the second control circuit is electrically connected to the first control circuit, and the first control circuit is electrically connected to the touch electrode layer.

In an embodiment of the embodiment, the touch electrode layer is disposed in the non-display area of the driving substrate, the second control circuit is disposed on an external circuit outside the driving substrate, the second control circuit is electrically connected to the first control circuit, and the first control circuit is electrically connected to the touch electrode layer.

Based on the above, in the design for the touch display device of the invention, the touch electrode layer is disposed in the non-display area of the driving substrate or outside the driving substrate. That is to say, because the touch electrode layer is not disposed in the display area of the driving substrate, the touch electrode layer may be disposed without increasing the overall thickness of the touch display device and reducing the display contrast ratio. In other words, in comparison with the conventional touch display devices, the touch display device of the invention has thinner thickness and more preferable display contrast ratio. Moreover, when the touch display device is in the touch state and the conductor performs the touch control on the touch display device, the first induced capacitance and the second induced capacitance connected in series are formed between the conductor and the touch electrode layer and between the conductor and the transparent conductive layer, respectively. In other words, when the touch display device is in the touch state, the touch display device can provide a capacitive touch sensing function when the conductor slidingly touches on the transparent conductive layer of the display module and the touch electrode layer.

To make the above features and advantages of the disclosure more comprehensible, several embodiments accompanied with drawings are described in detail as follows.

DESCRIPTION OF EMBODIMENTS

Figure 1A:
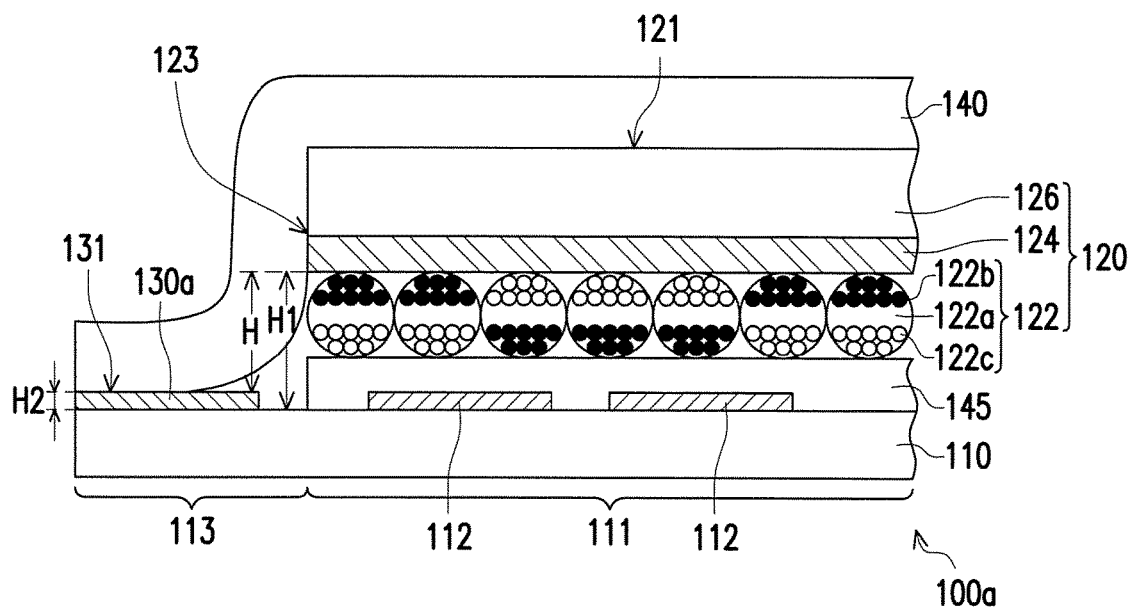
FIG. 1A illustrates a cross-sectional view of a touch display device according to an embodiment of the invention.
Figure 1B:
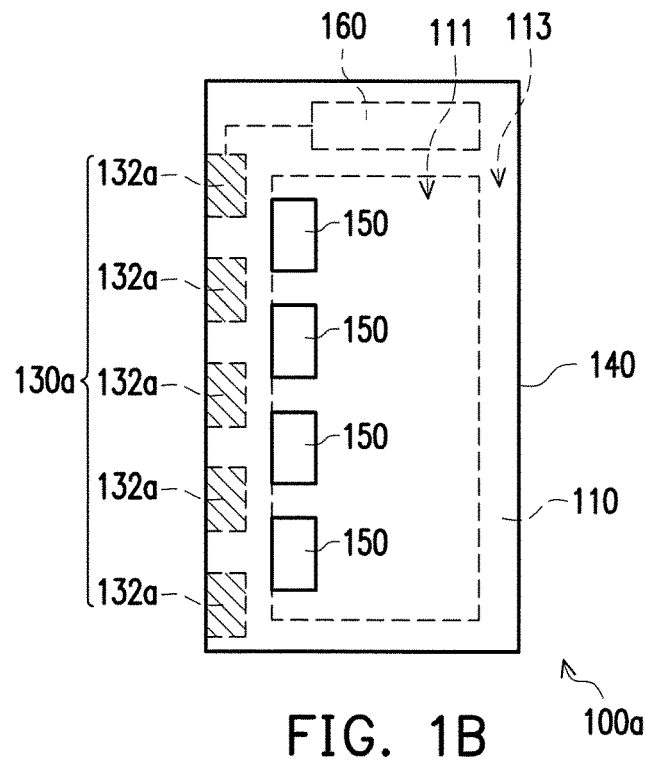
FIG. 1B illustrates a top view of the touch display device of FIG. 1A.

FIG. 1A illustrates a cross-sectional view of a touch display device according to an embodiment of the invention. FIG. 1B illustrates a top view of the touch display device of FIG. 1A. Referring to FIG. 1A and FIG. 1B together, in the present embodiment, a touch display device 100a includes a driving substrate 110, a display module 120, a touch electrode layer 130a and an insulating layer 140. The driving substrate 110 has a display area 111 and a non-display area 113, and the non-display area 113 is located outside the display area 111. The display module 120 includes a display medium layer 122, a transparent conductive layer 124 and a transparent cover plate 126 sequentially arranged on the driving substrate 110 and located in the display area 111. The touch electrode layer 130a is disposed in the non-display area 113 of the driving substrate 110. The insulating layer 140 covers an upper surface 121 of the display module 120 and extendedly covers a top surface 131 of the touch electrode layer 130a along a side edge 123 of the display module 120.

Specifically, in the present embodiment, the touch display device 100a is, for example, a card combining multiple cards into one and having display and touch control functions, with an overall thickness between 0.75 mm to 0.85 mm and a shape preferably being rectangular. The driving substrate 110 is, for example, a printed-circuit board including a plurality of electrodes 112, but not limited thereto. In other not illustrated embodiments, the driving substrate may also be an active device array substrate, but the present application is not limited thereto. The display module 120 may be implemented by a reflective display module, such as an electrophoretic display module, wherein the display medium layer 122 may be implemented by a microcapsule electrophoretic display layer. The display medium layer 122 includes a plurality of microcapsules, wherein each of the microcapsules is composed of an electrophoretic liquid 122a, a plurality of positively charged black particles 122b and a plurality of negatively charged white electric particle 122c. Naturally, in other not illustrated embodiments, the display medium layer may also be a micro-cup electrophoretic display layer, which is not particularly limited. The transparent conductive layer 124 of the display module 120 is located between the display medium layer 122 and the transparent cover plate 126, wherein a material of the transparent conductive layer 124 is, for example, indium tin oxide (ITO), or indium zinc oxide (IZO). A material of the transparent cover plate 126 is, for example, polyethylene terephthalate (PET), and aforesaid transparent cover plate 126 is a base material for carrying the transparent conductive layer 124 and the display medium layer 122 in the manufacturing process.

Referring back to FIG. 1A and FIG. 1B, the touch electrode layer 130a of the present embodiment is disposed in the non-display area 113 of the driving substrate 110, and the touch electrode layer 130a is composed of a plurality of touch electrodes 132a. Because the touch electrode layer 130a is not disposed in the display area 111 of the driving substrate 110, the overall thickness of the touch display device 100a will not increase. Furthermore, since the touch electrode layer 130a is not located above the display module 120, the display contrast ratio of the display module 120 will not be affected. In this case, a first vertical height H1 is provided between the transparent conductive layer 124 of the display module 120 and the driving substrate 110, a thickness of the touch electrode layer 130a is H2, and the first vertical height H1 is greater than the thickness H2 of the touch electrode layer 130a. In addition, the insulating layer 140 of the present embodiment extendedly covers the top surface 131 of the touch electrode layer 130a along the side edge 123 of the display module 120 from the upper surface 121 of the display module 120, so as to cover both the transparent cover plate 126 of the display module 120 and the touch electrode layer 130a. Herein, a material of the insulating layer 140 is, for example, polyethylene terephthalate (PET) or optically-clear adhesive (OCA), which has transparency and can protect the touch electrode layer 130a without affecting a display quality of the display module 120.

In addition, the touch display device 100a of the present embodiment further includes an optical adhesive layer 145, disposed between the driving substrate 110 and the display module 120, wherein the display module 120 is fixed onto the driving substrate 110 through the optical adhesive layer 145. Furthermore, the touch display device 100a further includes a plurality of icons 150, distributedly disposed on the display module 120 and adjacent to the side edge 123 of the display module 120 for allowing a user to touch and directly trigger the icons 150. Further, the touch display device 100a of the present embodiment may further include a control circuit 160, disposed in the non-display area 113 of the driving substrate 110, electrically connected to the touch electrode layer 130a and the transparent conductive layer 124, and having functions for controlling and driving the touch display device 100a.

Figure 2A:
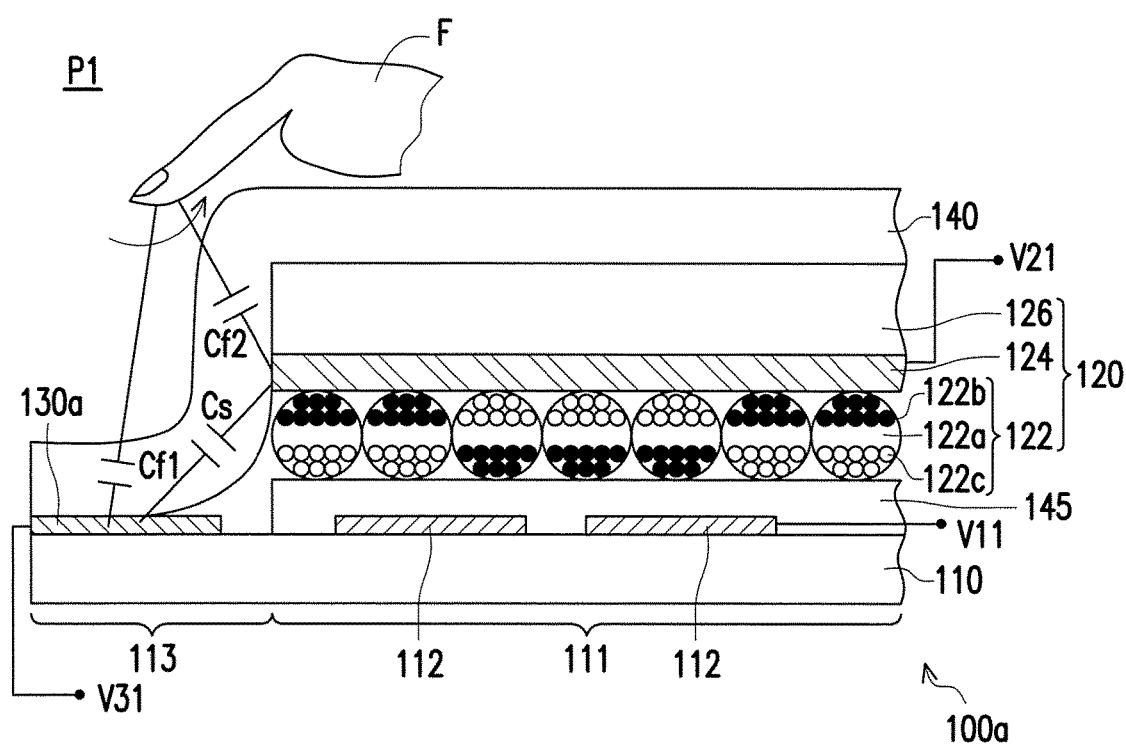
FIG. 2A illustrates a cross-sectional view of the touch display device of FIG. 1A in a touch state.
Figure 2B:
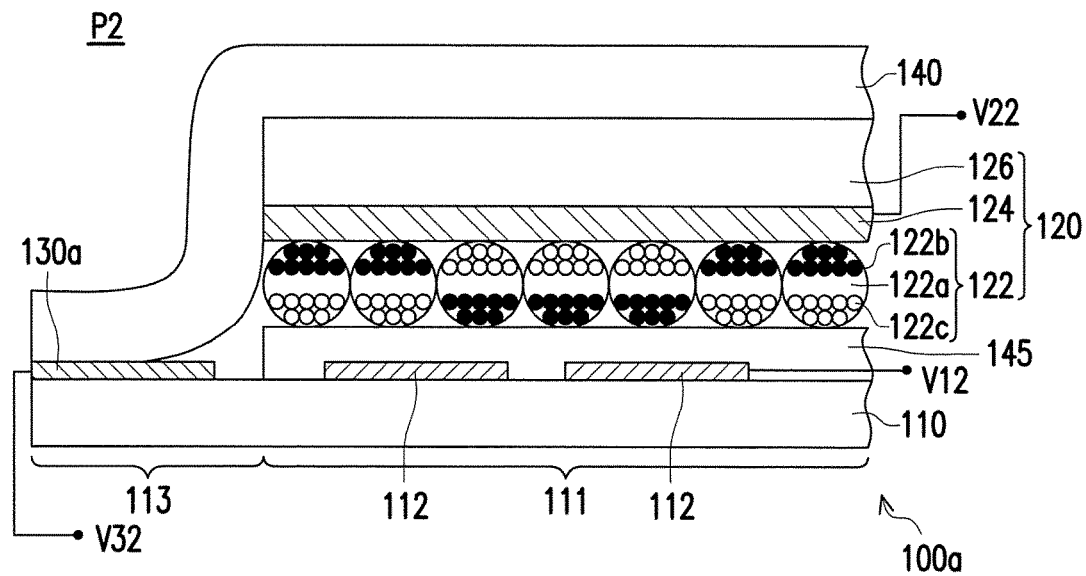
FIG. 2B illustrates a cross-sectional view of the touch display device of FIG. 1A in a display update process.
Figure 2C:
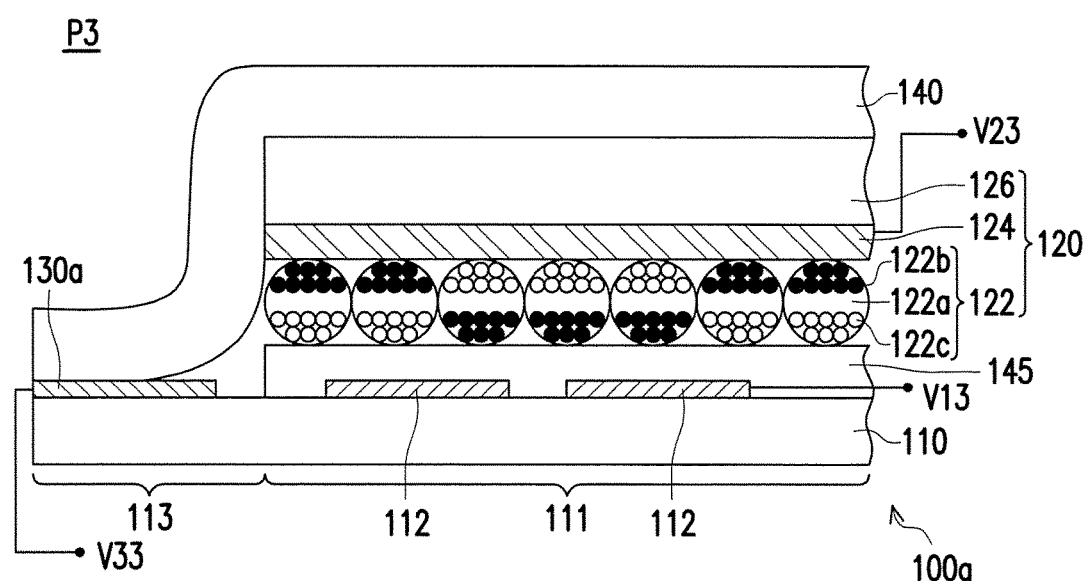
FIG. 2C illustrates a cross-sectional view of the touch display device of FIG. 1A in a shutdown state.

FIG. 2A illustrates a cross-sectional view of the touch display device of FIG. 1A in a touch state. FIG. 2B illustrates a cross-sectional view of the touch display device of FIG. 1A in a display update process. FIG. 2C illustrates a cross-sectional view of the touch display device of FIG. 1A in a shutdown state. Referring to FIG. 2A, when the touch display device 100a is in a touch state P1, the electrode 112 of the driving substrate 110 is connected to a floating voltage V11, and the transparent conductive layer 124 is connected to a first predetermined voltage V21. In the present embodiment, more preferably, the first predetermined voltage V21 is a ground voltage, the touch electrode layer 130a is connected to a second predetermined voltage V31, and the first predetermined voltage V21 is not equal to the second predetermined voltage V31. In this case, when a conductor F (e.g., the finger of the user) performs a touch control on the touch display device 100a, wherein the touch control may be in a manner of sliding touch, the conductor F simultaneously generates a first induced capacitance Cf1 and a second induced capacitance Cf2 in cooperation with the touch electrode layer 130a and the transparent conductive layer 124, respectively. The first induced capacitance Cf1 and the second induced capacitance Cf2 connected in series are formed between the conductor F and the touch electrode layer 130a and between the conductor F and the transparent conductive layer 124, respectively. A parasitic capacitance Cs exists between the touch electrode layer 130a and the transparent conductive layer 124 of the display module 120. When the conductor F performs the touch control on the touch display device 100a (i.e., when the conductor F simultaneously generates the first induced capacitance Cf1 and the second induced capacitance Cf2 in cooperation with the touch electrode layer 130a and the transparent conductive layer 124, respectively), the parasitic capacitance Cs is connected in parallel with the first induced capacitance Cf1 and the second induced capacitance Cf2 connected in series. When the conductor F slidingly touches on the touch display device 100a, the conductor F generates a capacity coupling with the electric field of the touch electrode layer 130a and the transparent conductive layer 124. Accordingly, there will be changes in the capacitance induced by the touch display device 100a (i.e., the original parasitic capacitance Cs becomes the parasitic capacitance Cs connected in parallel with the first induced capacitance Cf1 and the second induced capacitance Cf2 connected in series). In this way, a touch trajectory corresponding to the sliding touch may be calculated according to the changes in the capacitance. In brief, when the touch display device 100a is in the touch state, the touch display device 100a can provide the capacitive touch sensing function when the conductor F slidingly touches on the transparent conductive layer 124 of the display module 120 and the touch electrode layer 130a.

Referring to FIG. 2B, when the touch display device 100a is in a display update process P2, the electrode 112 of the driving substrate 110 is connected to a driving voltage V12, the transparent conductive layer 124 is connected to a third predetermined voltage V22, and the touch electrode layer 130a is connected to a ground voltage V32. In this case, because the touch electrode layer 130a is connected to the ground voltage V32, the sliding touch cannot be performed. Also, the electrode 112 of the driving substrate 110 is connected to the driving voltage V12 to drive the display module 120, and the transparent conductive layer 124 of the display module 120 is connected to the predetermined voltage V22 (e.g., a common voltage) for allowing the touch display device 100a to display. The situation described above is the preferable condition. However, if the voltage of the transparent conductive layer 124 is unstable (a VCOM voltage is unstable) because of interferences in the display update process, it is also possible to provide the touch function in the display update process. Alternatively, in the display update process, the voltage of the transparent conductive layer 124 may be set to a predetermined voltage value (the VCOM voltage) so the touch function may be achieved in the display update process.

Referring to FIG. 2C, when the touch display device 100a is in a shutdown state P3, the electrode 112 of the driving substrate 110 is connected to a first floating voltage V13, the transparent conductive layer 124 is connected to a second floating voltage V23, and the touch electrode layer 130a is connected to a ground voltage V33 or a third floating voltage V33. When the touch display device 100a is in the shutdown state P3, no display or touch control can be performed. Herein, voltage values of the first floating voltage V13, the second floating voltage V23 and the third floating voltage V33 may be the same or different.

In short, in the design for the touch display device 100a of the present embodiment, the touch electrode layer 130a is disposed in the non-display area 113 of the driving substrate 110. That is to say, the touch electrode layer 130a is not disposed in the display area 111 of the driving substrate 110, and thus the touch display device 100a of the present embodiment can have thinner thickness and more preferable display contrast ratio as compared to the conventional touch display devices. In addition, the touch display device 100a of the present embodiment has three states, which are the touch state P1, the display update process P2 and the shutdown state P3. Among them, since the touch function is provided in the touch state P1, and no touch function is provided in the display update process P2 and the shutdown state P3, the touch display device 100a is low in power consumption.

It should be noted that the reference numerals and a part of the contents in the previous embodiment are used in the following embodiments, in which identical reference numerals indicate identical or similar components, and repeated description of the same technical contents is omitted. For a detailed description of the omitted parts, reference can be found in the previous embodiment, and no repeated description is contained in the following embodiments.

Figure 3A:
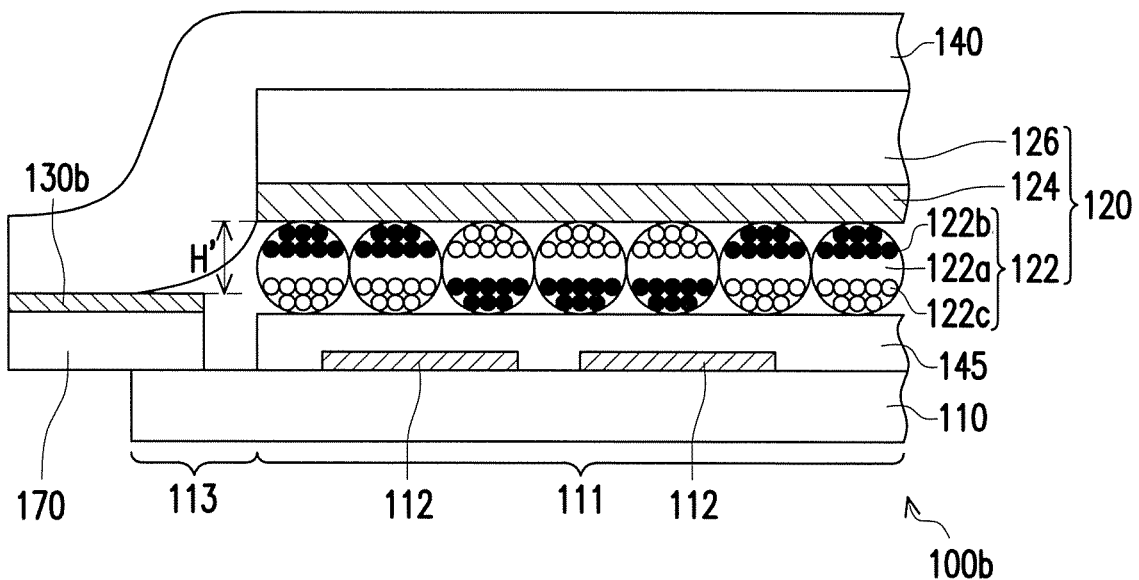
FIG. 3A is a cross-sectional view illustrating a touch display device according to another embodiment of the invention.
Figure 3B:
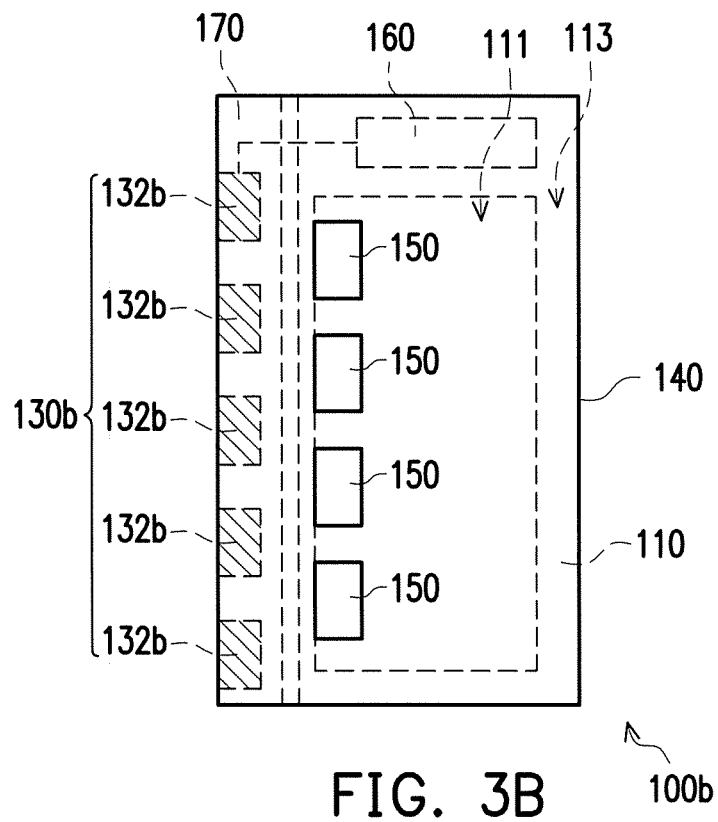
FIG. 3B illustrates a top view of the touch display device of FIG. 3A.

FIG. 3A is a cross-sectional view illustrating a touch display device according to another embodiment of the invention. FIG. 3B illustrates a top view of the touch display device of FIG. 3A. Referring to FIG. 1A, FIG. 1B, FIG. 3A and FIG. 3B together, a touch display device 100b of the present embodiment is similar to the touch display device 100a of FIG. 1A and FIG. 1B, and the difference between the two is that, a touch electrode layer 130b of the present embodiment is disposed on an external circuit 170 outside the driving substrate 110. Herein, the external circuit 170 is, for example, a flexible printed circuit board, covering a part of the non-display area 113 of the driving substrate 110, but not limited thereto. In other embodiments, the external circuit 170 may also be separated from the driving substrate 110 by a distance. Also, a vertical height H' is provided between the transparent conductive layer 124 of the display module 120 and the touch electrode layer 130b.

Figure 4A:
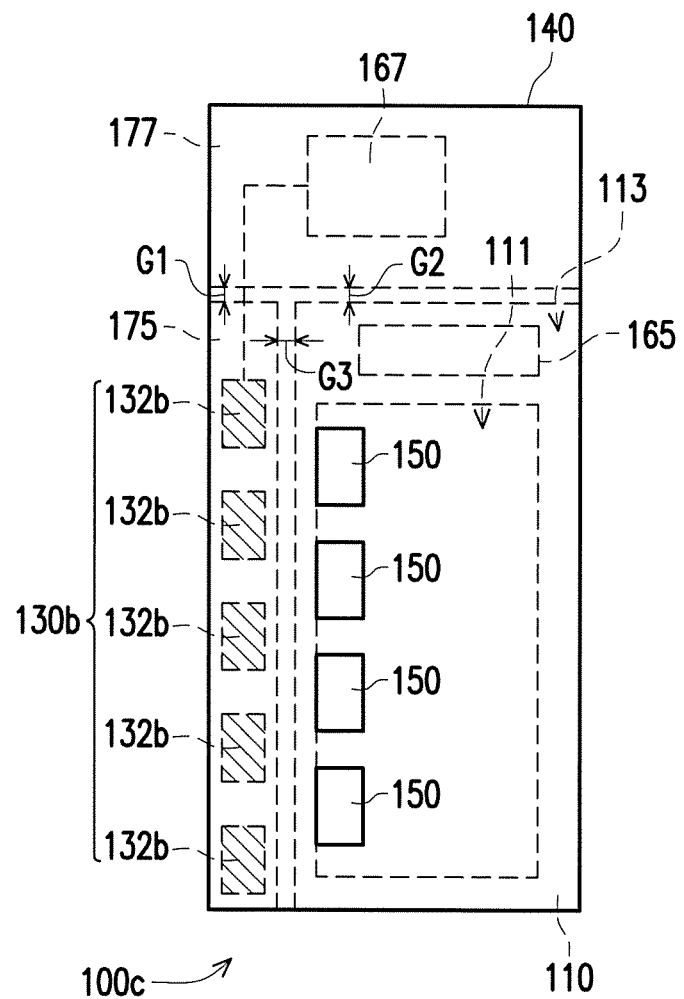
FIG. 4A illustrates a top view of a touch display device according to an embodiment of the invention.

FIG. 4A illustrates a top view of a touch display device according to an embodiment of the invention. Referring to FIG. 3B and FIG. 4A together, a touch display device 100c of the present embodiment is similar to the touch display device 100b of FIG. 3B, and the difference between the two is that, the touch display device 100c of the present embodiment includes two control circuits, which are a first control circuit 165 and a second control circuit 167. The first control circuit 165 is disposed in the non-display area 113 of the driving substrate 110, and electrically connected to the transparent conductive layer 124 (referring to FIG. 3A) so as to control the transparent conductive layer 124. The second control circuit 167 is disposed outside the driving substrate 110, and electrically connected to the touch electrode layer 130b so as to control the touch electrode layer 130b. Herein, the touch electrode layer 130b and the second control circuit 167 are respectively disposed on a first external circuit 175 and a second external circuit 177 outside the driving substrate 110. As shown in FIG. 4A, the first external circuit 175, the second external circuit 177 and the driving substrate 110 are not overlapping with each other but include gaps G1, G2 and G3 therebetween, wherein sizes of the gaps G1, G2 and G3 may be the same or different, which are not particularly limited herein. The optimal distance of the gap G3 achievable by the existing technology is 1 mm, and it is more preferable that the gap G3 does not exceed 5 mm. The first external circuit 175 and the second external circuit 177 are, for example, a flexible printed circuit board, but not limited thereto.

Figure 4B:
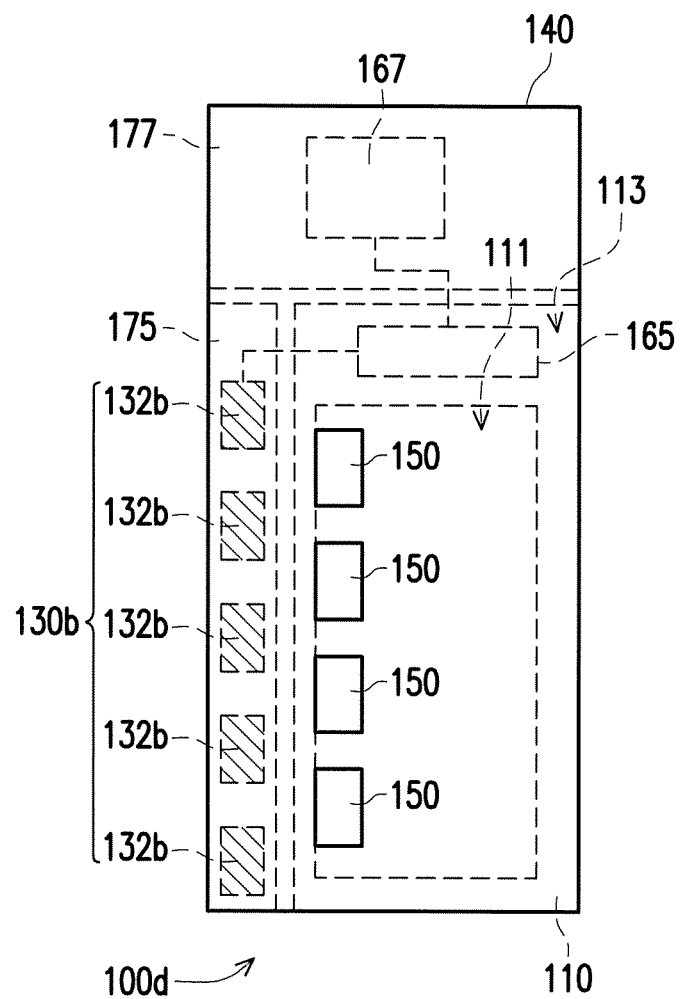
FIG. 4B illustrates a top view of a touch display device according to another embodiment of the invention.

FIG. 4B illustrates a top view of a touch display device according to another embodiment of the invention. Referring to FIG. 4A and FIG. 4B together, a touch display device 100d of the present embodiment is similar to the touch display device 100c of FIG. 4A, and the difference between the two is that, the second control circuit 167 of the present embodiment is electrically connected to the first control circuit 165, and the first control circuit 165 is electrically connected to the touch electrode layer 130b.

Figure 4C:
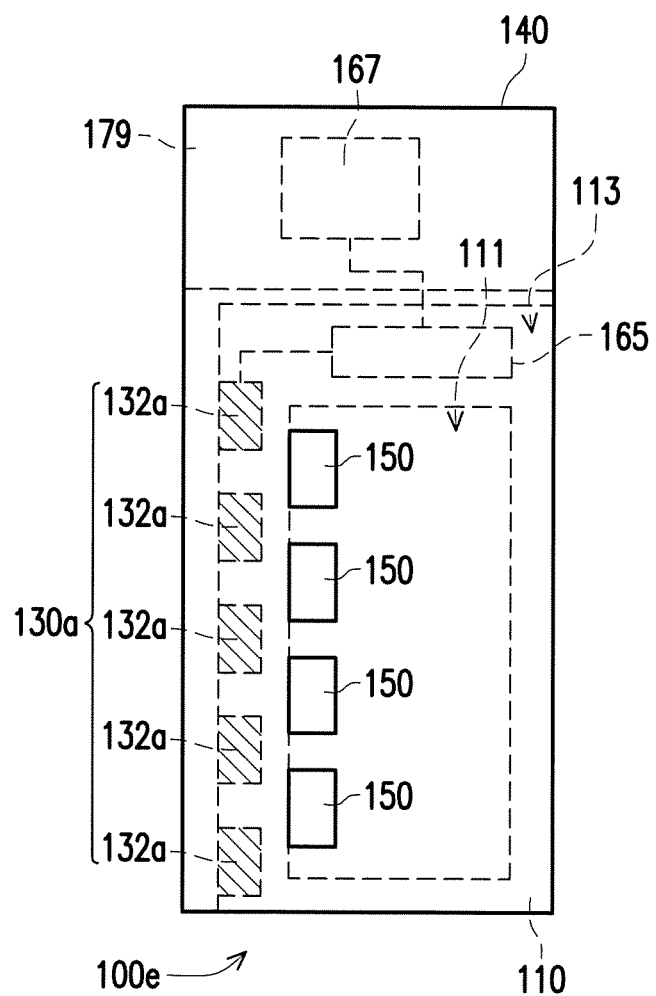
FIG. 4C illustrates a top view of a touch display device according to another embodiment of the invention.

FIG. 4C illustrates a top view of a touch display device according to another embodiment of the invention. Referring to FIG. 1B and FIG. 4C together, a touch display device 100e of the present embodiment is similar to the touch display device 100a of FIG. 1B, and the difference between the two is that, the second control circuit 167 is disposed outside an external circuit 179 outside the driving substrate 110, the second control circuit 167 is electrically connected to the first control circuit 165, and the first control circuit 165 is electrically connected to touch electrode layer 130a.

To sum up, in the design for the touch display device of the invention, the touch electrode layer is disposed in the non-display area of the driving substrate or outside the driving substrate. That is to say, the touch electrode layer is not disposed in the display area of the driving substrate, and thus the touch display device of the invention can have thinner thickness and more preferable display contrast ratio. Furthermore, when the touch display device is in the touch state, the touch display device can provide the capacitive touch sensing function when the conductor slidingly touches on the transparent conductive layer of the display module and the touch electrode layer. In addition, the touch display device of the invention has three states, which are the touch state, the display update process and the shutdown state. Among them, since the touch function is only provided in the touch state, and no touch function is provided in the display update process and the shutdown state, the touch display device is low in power consumption.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A touch display device, comprising:
   a driving substrate, having a display area and a non-display area located outside the display area;
   a display module, comprising a display medium layer, a transparent conductive layer and a transparent cover plate sequentially arranged on the driving substrate and located in the display area;
   a touch electrode layer, disposed in the non-display area of the driving substrate or outside the driving substrate; and
   an insulating layer, covering an upper surface of the display module and extendedly covering a top surface of the touch electrode layer along a side edge of the display module, wherein when the touch display device is in a touch state and a conductor performs a touch control on the touch display device, a first induced capacitance and a second induced capacitance connected in series are formed between the conductor and the touch electrode layer and between the conductor and the transparent conductive layer, respectively.

2. The touch display device as recited in claim 1, wherein the touch electrode layer is disposed on an external circuit outside the driving substrate.

3. The touch display device as recited in claim 2, wherein the external circuit covers a part of the non-display area of the driving substrate, or a gap is provided between the external circuit and the driving substrate.

4. The touch display device as recited in claim 1, wherein a parasitic capacitance exists between the touch electrode layer and the transparent conductive layer when the touch display device is in the touch state, and the parasitic capacitance is connected in parallel with the first induced capacitance and the second induced capacitance connected in series when the conductor performs the touch control on the touch display device.

5. The touch display device as recited in claim 1, wherein when the touch display device is in the touch state, an electrode on the driving substrate is connected to a floating voltage, the transparent conductive layer is connected to a ground voltage or a first predetermined voltage, and the touch electrode layer is connected to a second predetermined voltage.

6. The touch display device as recited in claim 1, wherein when the touch display device is in a display update process, an electrode on the driving substrate is connected to a driving voltage, the transparent conductive layer is connected to a predetermined voltage, and the touch electrode layer is connected to a ground voltage.

7. The touch display device as recited in claim 1, wherein when the touch display device is in a shutdown state, an electrode on the driving substrate is connected to a first floating voltage, the transparent conductive layer is connected to a second floating voltage, and the touch electrode layer is connected to a ground voltage or a third floating voltage, wherein when the touch display device is in the shutdown state, no display or touch control can be performed.

8. The touch display device as recited in claim 1, further comprising:
   a plurality of icons, distributedly disposed on the display module and adjacent to the side edge of the display module.

9. The touch display device as recited in claim 1, further comprising:

a control circuit, disposed in the non-display area of the driving substrate, and electrically connected to the touch electrode layer and the transparent conductive layer.

10. The touch display device as recited in claim 1, further comprising:
    a first control circuit, disposed in the non-display area of the driving substrate, and electrically connected to the transparent conductive layer; and
    a second control circuit, disposed outside the driving substrate, and electrically connected to the touch electrode layer.

11. The touch display device as recited in claim 10, wherein the touch electrode layer and the second control circuit are respectively disposed on a first external circuit and a second external circuit outside the driving substrate.

12. The touch display device as recited in claim 10, wherein the touch electrode layer and the second control circuit are respectively disposed on a first external circuit and a second external circuit outside the driving substrate, the second control circuit is electrically connected to the first control circuit, and the first control circuit is electrically connected to the touch electrode layer.

13. The touch display device as recited in claim 10, wherein the touch electrode layer is disposed in the non-display area of the driving substrate, the second control circuit is disposed on an external circuit outside the driving substrate, the second control circuit is electrically connected to the first control circuit, and the first control circuit is electrically connected to the touch electrode layer.

* * * * *